US012710595B2

(12) United States Patent
Rekhi et al.

(10) Patent No.: US 12,710,595 B2
(45) Date of Patent: Aug. 18, 2026

(54) BIDIRECTIONAL MICRORING RESONATOR-BASED PHOTONIC LINK ARCHITECTURE

(71) Applicant: NVIDIA Corp., Santa Clara, CA (US)

(72) Inventors: Angad Rekhi, San Francisco, CA (US); Benjamin Giles Lee, Ridgefield, CT (US)

(73) Assignee: NVIDIA Corp., Santa Clara, CA (US)

( * ) Notice: Subject to any disclaimer, the term of this patent is extended or adjusted under 35 U.S.C. 154(b) by 613 days.

(21) Appl. No.: 18/318,132

(22) Filed: May 16, 2023

(65) Prior Publication Data

US 2024/0385381 A1 Nov. 21, 2024

(51) Int. Cl.

*G02B 6/293* (2006.01)
*G02B 6/12* (2006.01)
*H04B 10/50* (2013.01)
*H04J 14/02* (2006.01)

(52) U.S. Cl.

CPC ....... *G02B 6/2934* (2013.01); *G02B 6/12007* (2013.01); *G02B 6/29343* (2013.01); *H04J 14/0307* (2023.08); *G02B 2006/12164* (2013.01); *H04B 10/506* (2013.01)

(58) Field of Classification Search

CPC .............. G02B 6/12007; G02B 6/2934; G02B 6/29343; G02B 2006/12164; H04B 10/506; H04J 14/0307

See application file for complete search history.

(56) References Cited

U.S. PATENT DOCUMENTS 10,135,218 B2 * 11/2018 Popovic .............. H01S 3/08086
11,101,912 B2 * 8/2021 Stojanovic .......... H04J 14/0307
2017/0214472 A1 * 7/2017 Caplan .................... H04J 14/02
2020/0257066 A1 * 8/2020 Seyedi ............... G02B 6/29382

FOREIGN PATENT DOCUMENTS

EP 3342071 B1 * 6/2022 ........... H04B 10/506
WO WO-2018102991 A1 * 6/2018 ............. H04J 14/02

OTHER PUBLICATIONS

English Translation for WO-2018102991-A1, 17 pages (Year: 2018).*

* cited by examiner

*Primary Examiner* — Daniel Petkovsek

(74) *Attorney, Agent, or Firm* — Carnelian Law, LLC

(57) ABSTRACT

Optical transceiver architecture utilizing micro-ring modulators and micro-ring resonators configured to route resonant wavelengths of light injected into each micro-ring resonator's input port and through port to that micro-ring resonator's drop port and add port, respectively. The micro-ring resonators drop two distinct streams of data modulated onto the same optical wavelength, or two wavelengths separated by an integer number of free spectral ranges coupled into the micro-ring resonators in two different directions.

20 Claims, 4 Drawing Sheets

222
228
228
220
D0
D1
D2
D3
D4
D5
D6
D7
TX
LASER 216
LASER 218
230
226
224
D4
D0
D5
D1
D6
D2
D7
D3
RX

BIDIRECTIONAL MICRORING RESONATOR-BASED PHOTONIC LINK ARCHITECTURE

BACKGROUND

The bandwidth of optical data links continues to increase. Bandwidth may be increased by for example increasing the baud rate or by increasing the use of data multiplexing.

Multiplexing mechanisms include the use of multiple fibers, multiple spatial modes, time-division multiplexing, multiple wavelengths, multiple polarizations, and more complex modulation schemes. Applying as many of these mechanisms together as is practical may lead to continued scaling to higher total throughput.

Each mechanism presents challenges that require circuit-, architecture-, and/or algorithm-level implementations to put into practice. Overemphasizing the use of any one mechanism may produce diminishing returns (i.e., degraded energy efficiency).

Prior solutions may utilize micro-ring resonators (MRRs) to recover data sent over an optical bus unidirectionally. A conventional micro-ring resonator utilizes one input port and two output ports. One of the output ports is the "through port", through which unselected optical wavelengths pass, and the other output port is the "drop port", through which selected optical wavelengths pass.

A micro-ring resonator, also known in the art as an optical ring resonator, is a configuration of optical waveguides ("light guide" herein, for short) in which at least one waveguide comprises a closed loop (the "ring") coupled to a light input port and a light output port (e.g., drop port), which are also typically light guides. When light of the resonant wavelength is injected into the loop from the input port, the light builds in intensity over multiple round trips through the loop due to constructive interference; some fraction of this light exits the ring onto the drop port. Only select wavelengths will resonate within the ring. This enables the micro-ring resonator to function as a filter to drop only certain wavelengths of light.

A micro-ring modulator is a micro-ring resonator that adds an optical data signal (e.g., a binary "1" or "0", or a symbol encoding multiple bits) to the resonant wavelengths of light that are transmitted on the through port. For example, modulation may be carried out by modulating the refractive index of the light guide used for the ring, which modulates the intensity (amplitude) of the light signals that are transmitted on the through port light guide. Generally, modulation may be carried out in many ways, including via optical interference, phase shifting, frequency shifting, and other approaches known in the art, alone or in combination.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
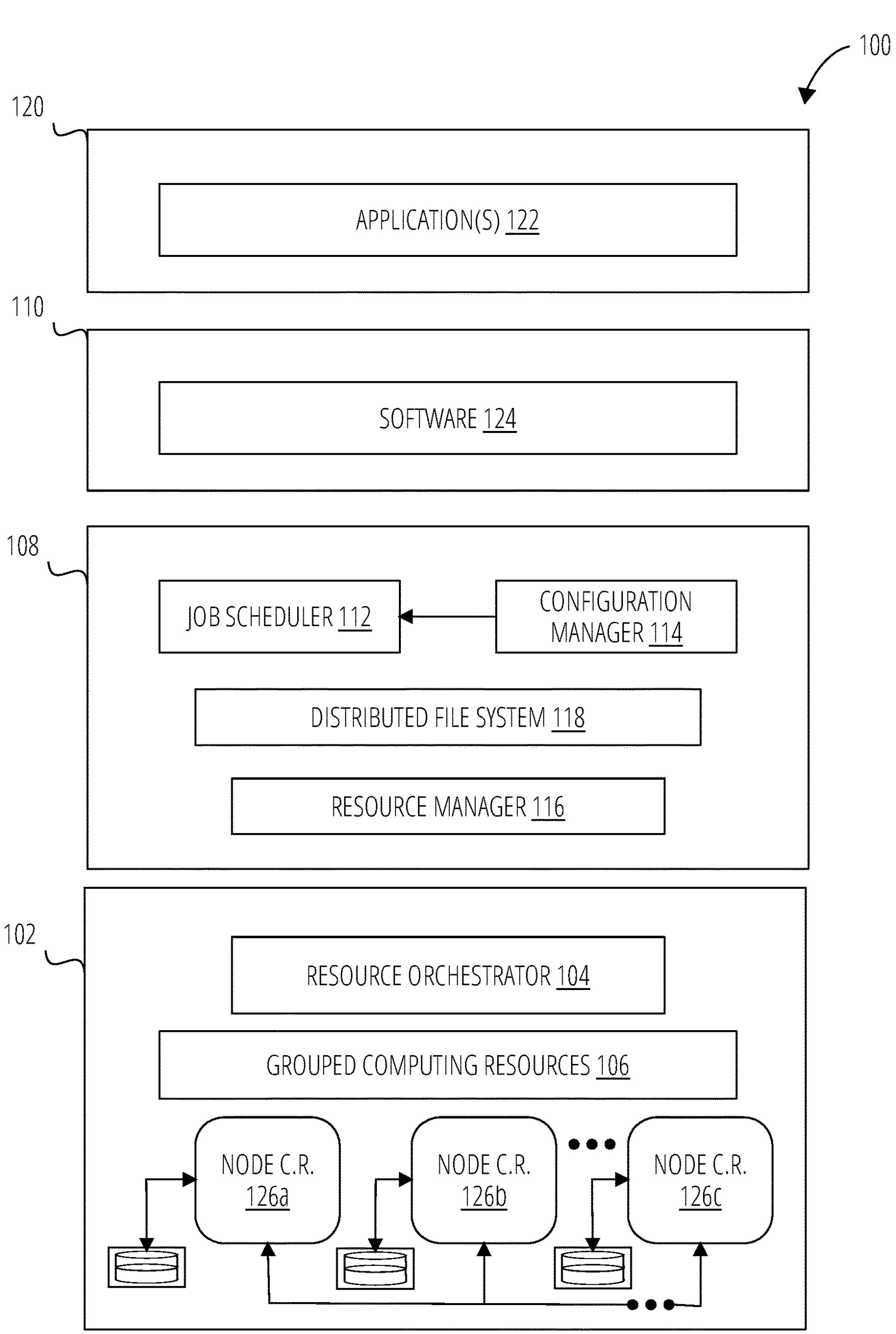
FIG. 1 depicts a data center in accordance with one embodiment.

An optical transceiver architecture utilizing micro-ring modulators and micro-ring resonators is disclosed that is configured to route resonant wavelengths of light injected into each micro-ring resonator's input port and through port, respectively, to that micro-ring resonator's drop port and add port, respectively. These disclosed mechanisms operate at the circuit/link-level of a communication system. Although the exemplary embodiments utilize optical resonators, the disclosed mechanisms apply more broadly to any family of narrowly resonant optical devices, which could include for example disk or micro-disk resonators, as well as 1D or 2D photonic crystal defect resonators. Herein, the term "micro-ring resonator" should be understood to include such broad categories of optical resonators, unless otherwise indicated by context.

Embodiments in accordance with the disclosed mechanisms may utilize micro-ring resonators that drop two distinct streams of data modulated onto the same optical wavelength, or two wavelengths separated by an integer number of free spectral ranges coupled into the micro-ring resonators in two different directions. A form of multiplexing is thus implemented beyond those utilized in conventional approaches. Herein, this form of multiplexing may be referred to as "directional multiplexing".

Directional multiplexing may be utilized in conjunction with conventional multiplexing approaches for increasing the bandwidth of optical links. For example, several directional multiplexing devices, each operating with different wavelengths, may be cascaded to combine directional multiplexing with wavelength-division multiplexing.

To make the following description easier to understand, micro-ring resonators utilized in transmitters, which also perform modulation, are referred to as "micro-ring modulators". The micro-ring resonators utilized in receivers are simply referred to as such because they don't generally perform modulation with a data signal. However, it should be understood that both types of rings operate as "micro-ring resonators".

A single micro-ring resonator may be utilized to drop two different streams of data modulated onto the same optical wavelength (or two wavelengths separated by an integer number of free spectral ranges of the ring). This amortizes the power used to tune the micro-ring to the desired operating wavelength(s) between the two different data streams that the ring drops. In this manner, throughput may be doubled while improving the energy efficiency of the link (reducing the energy per bit).

Unlike conventional approaches, each micro-ring resonator in the receiver comprises two input ports and four output ports. Light entering the ring from the bus in each direction is either sent through to the other side of the bus (if not at the desired wavelength), or to that input direction's corresponding drop port (if it matches the drop port's configured wavelength).

In one embodiment, light signals of a same wavelength traverse two directions through the bus waveguide and through each micro-ring resonator. Additional features may be incorporated for such operation. For example, directional couplers or isolators may be utilized at either end of the bus to prevent light that is not fully dropped by the micro-ring resonators (which may for example be more severe during link initialization) from interfering with the source of the modulated light (i.e., a frequency comb laser).

The following exemplary embodiments are depicted and described utilizing one or more frequency comb laser light source(s). Other types of multi-wavelength light sources (or individual, single-wavelength light sources) may also be utilized, as known in the art. The disclosed mechanisms are generally applicable with single-mode or multi-mode optical fiber communications.

FIG. 1 depicts an exemplary data center 100, in accordance with at least one embodiment. The data center 100 includes, without limitation, a data center infrastructure layer 102, a framework layer 108, software layer 110, and an application layer 120. The data center 100 may execute many deep learning, graphics, and other compute- and energy-intensive workloads concurrently, and may utilize many graphics processing units and/or microprocessors to do so.

The data center infrastructure layer 102 may include a resource orchestrator 104, grouped computing resources 106, and node computing resources ("node C.R.s") Node C.R. 126*a*, Node C.R. 126*b*, Node C.R. 126*c*, . . . node C.R. N), where "N" represents any whole, positive integer. The node C.R.s may include, but are not limited to, any number of central processing units ("CPUs") or other processors (including accelerators, field programmable gate arrays ("FPGAs"), graphics processing units, etc.), memory devices (e.g., dynamic read-only memory), storage devices (e.g., solid state or disk drives), network input/output ("NW I/O") devices, network switches, virtual machines ("VMs"), power modules, and cooling modules, etc. One or more node C.R.s from among node C.R.s may be a server having one or more of above-mentioned computing resources.

Communication within and between the node C.R.s may utilize optical communications and may benefit from optical transceiver implementations in accordance with the embodiments described herein. Optical communication between data centers themselves, and between data centers and end user devices, may also benefit from utilizing such transceivers. Optical communication over and between local or wide area networks, Internet backbone cables, and so on may also benefit from the advantages incurred by utilizing such transceivers. Generally, transceivers in accordance with the disclosed embodiments may be advantageous in systems where high-bandwidth optical communications is utilized, for example computer server systems, automobiles, and robotic systems (see FIG. 3 for example).

The grouped computing resources 106 may include separate groupings of node C.R.s housed within one or more racks (not shown), or many racks housed in data centers at various geographical locations (also not shown). Separate groupings of node C.R.s within grouped computing resources 106 may include grouped compute, network, memory or storage resources that may be configured or allocated to support one or more workloads. Several node C.R.s including CPUs or processors may be grouped within one or more racks to provide compute resources to support one or more workloads. One or more racks may also include any number of power modules, cooling modules, and network switches, in any combination.

The resource orchestrator 104 may configure or otherwise control one or more node C.R.s and/or grouped computing resources 106. The resource orchestrator 104 may include a software design infrastructure ("SDI") management entity for data center 100. The resource orchestrator 104 may include hardware, software or some combination thereof.

A framework layer 108 includes, without limitation, a job scheduler 112, a configuration manager 114, a resource manager 116, and a distributed file system 118. The framework layer 108 may include a framework to support software 124 of software layer 110 and/or one or more application(s) 122 of application layer 220. The software 124 or application(s) 122 may respectively include web-based service software or applications, such as those provided by Amazon Web Services, Google Cloud and Microsoft Azure.

The framework layer 108 may be, but is not limited to, a type of free and open-source software web application framework such as Apache Spark™ (hereinafter "Spark") that may utilize a distributed file system 118 for large-scale data processing (e.g., "big data"). The job scheduler 112 may include a Spark driver to facilitate scheduling of workloads supported by various layers of data center 100.

The configuration manager 114 may be capable of configuring different layers such as software layer 110 and framework layer 108, including Spark and distributed file system 118 for supporting large-scale data processing. The resource manager 116 may be capable of managing clustered or grouped computing resources mapped to or allocated for support of distributed file system 118 and distributed file system 118. The clustered or grouped computing resources may include grouped computing resources 106 at data center infrastructure layer 102. The resource manager 116 may coordinate with resource orchestrator 104 to manage these mapped or allocated computing resources.

The software 124 included in software layer 110 may include software used by at least portions of node C.R.s, grouped computing resources 106, and/or distributed file system 118 of framework layer 108. One or more types of software may include, but are not limited to, Internet web page search software, e-mail virus scan software, database software, and streaming video content software.

The application(s) 122 included in application layer 120 may include one or more types of applications used by at least portions of node C.R.s, grouped computing resources 106, and/or distributed file system 118 of framework layer 108. In at least one or more types of applications may include, without limitation, CUDA applications, 5G network applications, artificial intelligence applications, data center applications, and/or variations thereof.

Any of configuration manager 114, resource manager 116, and resource orchestrator 104 may implement any number and type of self-modifying actions based on any amount and type of data acquired in any technically feasible fashion. Self-modifying actions may relieve a data center operator of data center 100 from making possibly bad configuration decisions and possibly avoiding underutilized and/or poor performing portions of a data center.

Figures 2A, 2B:
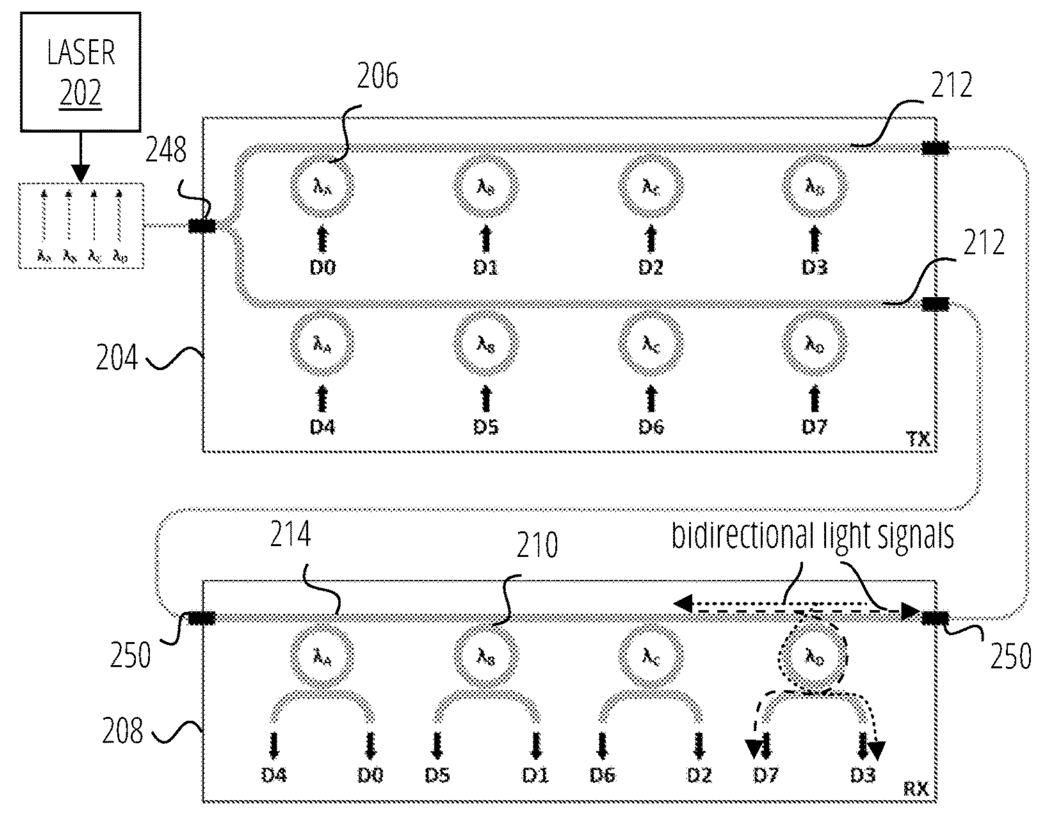
FIG. 2A depicts an embodiment in which a frequency comb laser is used to inject four different wavelengths into a transmitter via a single fiber.
FIG. 2B depicts an embodiment utilizing two frequency comb lasers to inject eight different wavelengths into a transmitter via two fibers.

FIG. 2A depicts an embodiment utilizing a frequency comb laser 202 to generate four different wavelengths ($\lambda_A$-$\Delta_D$) into a transmitter 204 via a single fiber. Other numbers of wavelengths may also be utilized. In practice, the number of wavelengths and hence number of micro-ring modulators and micro-ring resonators utilized may be limited by the wavelength spacing required to avoid unacceptable interference between the wavelengths utilized in a particular implementation.

The multi-wavelength light generated by the frequency comb laser 202 passes through an optical splitter 248 (which also acts as an optical coupler) onto two input light guides (transmitter buses 212), each of which has four (one per wavelength) micro-ring modulators 206 coupled to it. Each micro-ring modulator 206 is tuned to one of the four different input wavelengths. The light split between the two buses may be substantially even on a transmitted power basis.

Each micro-ring modulator 206 modulates a corresponding optical wavelength with a different data stream (e.g., binary bit streams D0 to D7). The modulated light from the two buses is coupled into optical light guides (e.g., longer-haul optical fiber) that both couple via optical couplers 250 into the same receiver light guide (receiver bus 214) on the receiver 208 from two different ends.

The receiver 208 comprises four micro-ring resonators 210 coupled to the receiver bus 214 that are each configured to match the free spectral range and operating wavelength of a corresponding pair of the micro-ring modulators 206 (one from each transmitter bus 212). Each micro-ring resonator 210 drops two data streams. For example, the micro-ring resonator tuned for $\lambda_D$ filters out modulated light signals with wavelength $\lambda_D$ from two directions, and drops data streams D3 and D7 into two different waveguides for separate processing.

This implementation may utilize optical isolators and/or directional couplers (not depicted) between the transmitter 204 and receiver 208, or on one of either the transmitter 204 or the receiver 208, to prevent light not fully dropped by the micro-ring resonators 210 from interfering with operation of the micro-ring modulators 206 or the frequency comb laser 202.

The power budget necessary to dynamically tune the resonant frequencies of the micro-ring resonators 210 in the receiver 208 (e.g., via thermal heating and cooling) is halved over conventional mechanisms that match the number of micro-ring modulators 206 in the transmitter 204 to the number of micro-ring resonators 210 in the receiver 208. This is likewise the case for the embodiments depicted in FIG. 2B and FIG. 2C.

FIG. 2B depicts an embodiment of utilizing two frequency comb lasers 216, 218 to generate eight different wavelengths ($\lambda_A$-$\lambda_D$ and $\lambda'_A$-$\lambda'_D$) into a transmitter 220 via two fibers. One fiber is utilized per frequency comb laser. Other numbers of wavelengths may also be utilized.

The light from the frequency comb lasers 216, 218 is coupled into two transmitter buses 228. The frequency comb lasers 216, 218 are configured such that the wavelengths output from one are offset from those output from the other by an integer number of the free spectral ranges of the micro-ring resonators 226 arranged along the receiver bus 230. The micro-ring modulators 222 coupled to the transmitter buses 228 are also configured to resonate at these wavelengths.

The micro-ring resonators 226 in the receiver 224 drop data streams at wavelengths separated by an integer number of free spectral ranges, where that integer need not be equal to zero. The embodiment of FIG. 2B is therefore more generally applicable than the embodiment of FIG. 2A. Similar to the embodiment of FIG. 2A, the embodiment of FIG. 2B may also utilize isolators or directional couplers (not depicted).

In a variation of the implementation depicted in FIG. 2B, a single frequency comb laser may be utilized to generate all wavelengths ($\lambda_A$-$\lambda_D$ and $\lambda'_A$-$\lambda'_D$) onto a single fiber that couples into the transmitter, and the two groups of four wavelengths each are then separated by a band demultiplexer at the receiver before separately being input into the two receiver buses. The configuration of such an embodiment will be evident in view of the embodiment depicted in FIG. 2C.

Figure 2C:
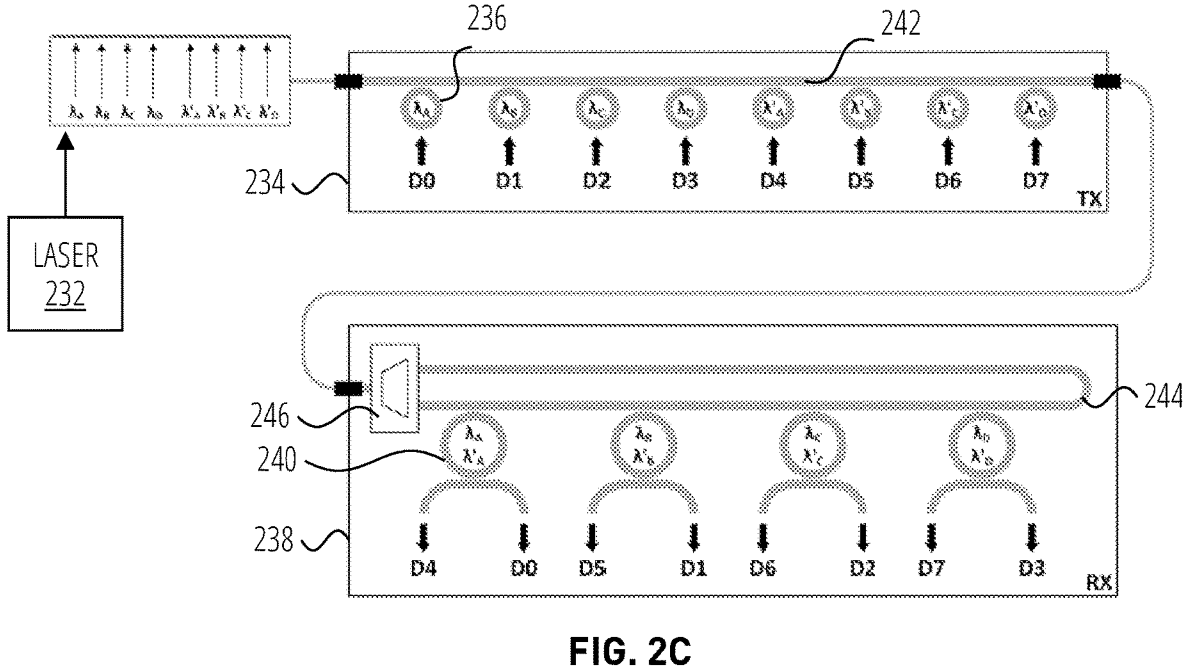
FIG. 2C depicts an embodiment utilizing a frequency comb laser to generate eight different wavelengths into a transmitter via a single fiber.

FIG. 2C depicts an embodiment of utilizing a frequency comb laser 232 to generate eight different wavelengths ($\lambda_A$-$\lambda_D$ and $\lambda'_A$-$\lambda'_D$) into a transmitter 234 via a single fiber. Other numbers of wavelengths may also be utilized. An advantage of this configuration is the utilization of only a single light guide (e.g., fiber) between the transmitter 234 and the receiver 238.

The frequency comb laser 232 is configured such that half of the wavelengths are offset from the other half by a nonzero integer number of free spectral ranges of the micro-ring resonators 240 of the receiver 238. The generated light passes through eight micro-ring modulators 236 arranged along the transmitter bus 242, each of which modulates a particular one of the optical wavelengths with a different data stream (D0 to D7).

The free spectral ranges of the micro-ring modulators 236 are configured to be (at least) twice those of the micro-ring resonators 240. In general, the separation between the wavelengths dropped by each micro-ring resonator 240 should be an exact (to within the precision needed for the particular implementation) multiple of the free spectral range of the micro-ring resonator, but the ratio between the free spectral ranges of the micro-ring modulators 236 and the micro-ring resonators 240 should be at least two (2:1) to prevent the micro-ring modulators 236 from interfering with other laser lines in the spectrum. For example, the free spectral ranges of the micro-ring modulators 236 could be 2.1 or 2.2 times the free spectral ranges of the micro-ring resonators 240.

The modulated light from the transmitter 234 is communicated to the receiver 238 via a single fiber. In the receiver 238, the light passes through a band demultiplexer 246 that separates the light into two groups of wavelengths on the receiver bus 244. The receiver bus 244 is arranged as a bidirectional loop, with one group of wavelengths flowing in one direction, and the other group of wavelengths flowing in the other direction. These wavelength groups are offset from one another by a nonzero integer number of the free spectral ranges of the micro-ring resonators 240. The micro-ring resonators 240 are configured such that each one drops two data streams at wavelengths separated by an integer number of free spectral ranges into two different waveguides. This implementation may also utilize isolators and/or directional couplers that are not depicted.

Figure 3:
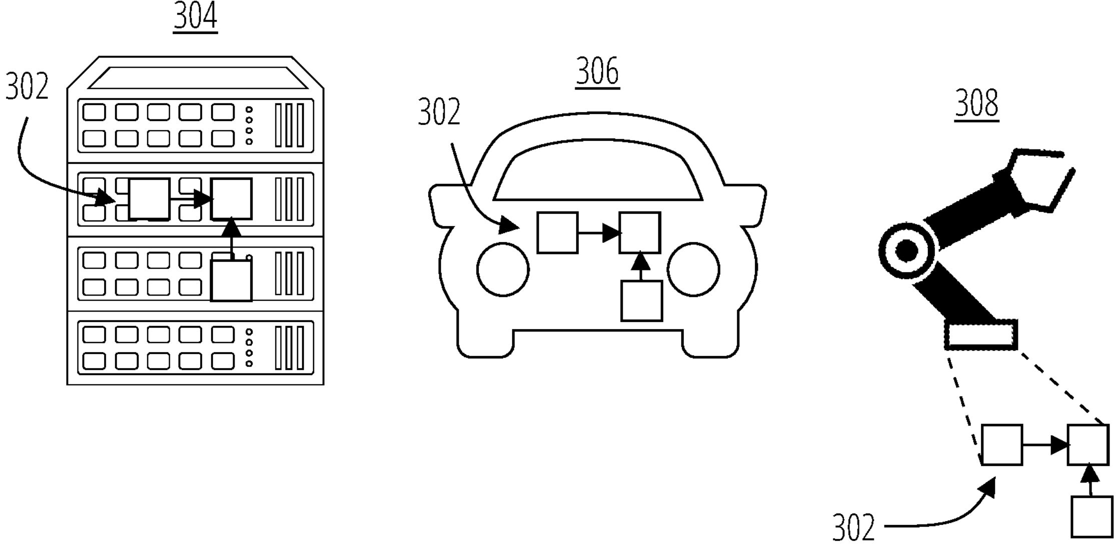
FIG. 3 depicts applications of an optical transceiver 302 in accordance with various embodiments.

FIG. 3 depicts exemplary scenarios for use of an optical transceiver 302 in accordance with some embodiments. An optical transceiver 302 may be utilized in a computing system 304 (e.g., in a server farm, or within a server computer system), a vehicle 306 (e.g., a car, truck, train, or airplane), and a robot 308 (or among robots in a factory), to name just a few examples. The optical transceiver 302 may be particularly useful for high-speed communication in environments subject to high levels of electromagnetic interference (EMI).

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A transceiver comprising:

a multi-wavelength light source;

an optical splitter to split light from the light source onto a plurality of transmitter light guides;

a plurality of micro-ring modulators coupled to each transmitter light guide, each micro-ring modulator tuned to modulate one of the wavelengths of light generated by the light source with a data signal;

a plurality of optical couplers arranged to couple light from the transmitter light guides into different ends of a receiver light guide; and a plurality of micro-ring resonators coupled to the receiver light guide, each micro-ring resonator configured to drop a plurality of the wavelengths of light.

2. The transceiver of claim 1, wherein the plurality of transmitter light guides consists of two light guides.

3. The transceiver of claim 1, wherein each of the micro-ring resonators is configured to drop exactly two different wavelengths of light.

4. The transceiver of claim 3, wherein the two different wavelengths of light are coupled in different directions to drop ports of the micro-ring resonators.

5. The transceiver of claim 1, wherein each of the micro-ring resonators is configured to match a free spectral range and an operating wavelength of a corresponding plurality of the micro-ring modulators.

6. The transceiver of claim 5, wherein each of the corresponding plurality of micro-ring modulators is configured on a different one of the transmitter light guides.

7. A transceiver comprising:

a plurality of multi-wavelength light sources;

each light source coupled to a separate transmitter light guide;

each transmitter light guide coupled to a plurality of micro-ring modulators, each micro-ring modulator tuned to modulate a different one of the wavelengths of light generated by the light source with a data signal;

a plurality of optical couplers arranged to couple light from the transmitter light guides into different ends of a receiver light guide;

a plurality of micro-ring resonators coupled to the receiver light guide, each micro-ring resonator configured to drop a plurality of the wavelengths of light; and wherein the light sources are configured such that the wavelengths output from one are offset from those output from the other by an integer number of free spectral ranges of the micro-ring resonators.

8. The transceiver of claim 7, wherein the plurality of transmitter light guides consists of two light guides.

9. The transceiver of claim 7, wherein each of the micro-ring resonators is configured to drop exactly two different wavelengths of light.

10. The transceiver of claim 9, wherein the two different wavelengths of light are coupled in different directions to drop ports of the micro-ring resonators.

11. The transceiver of claim 7, wherein each of the micro-ring resonators is configured to match a free spectral range and an operating wavelength of a corresponding plurality of the micro-ring modulators.

12. The transceiver of claim 11, wherein each of the corresponding plurality of micro-ring modulators is configured on a different one of the transmitter light guides.

13. A transceiver comprising:

a multi-wavelength light source coupled to a transmitter light guide;

a plurality of micro-ring modulators coupled to the transmitter light guide, each micro-ring modulator tuned to modulate one of the wavelengths of light generated by the light source with a data signal;

a plurality of optical couplers configured to couple light from the transmitter light guide into a receiver light guide;

a plurality of micro-ring resonators coupled to the receiver light guide, each micro-ring resonator configured to drop a plurality of the wavelengths of light; and wherein the light source is configured such that half of the wavelengths are offset from the other half by a nonzero integer number of free spectral ranges of the micro-ring resonators.

14. The transceiver of claim 13, wherein the plurality of micro-ring modulators consists of eight micro-ring modulators arranged along the transmitter light guide.

15. The transceiver of claim 13, wherein free spectral ranges of the micro-ring modulators are configured to be at least twice the free spectral ranges of the micro-ring resonators.

16. The transceiver of claim 13, further comprising a band demultiplexer configured to separate light from the transmitter light guide into two groups of wavelengths on the receiver light guide.

17. The transceiver of claim 16, wherein the receiver light guide is configured in a bidirectional loop.

18. The transceiver of claim 16, wherein the wavelength groups are offset from one another by a nonzero integer number of the free spectral ranges of the micro-ring resonators.

19. The transceiver of claim 13, wherein different wavelengths of light are coupled in different directions to drop ports of the micro-ring resonators.

20. The transceiver of claim 13, wherein each of the micro-ring resonators is configured to match a free spectral range and an operating wavelength of a corresponding pair of the micro-ring modulators.

* * * * *